June 21, 1938.  E. CHALLET  2,121,283
INSULATING MEMBER FOR ELECTRIC HEATING ELEMENTS
Filed March 29, 1937
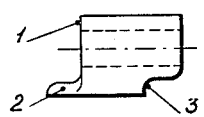
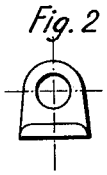
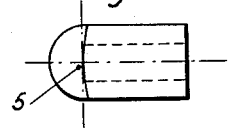
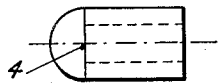
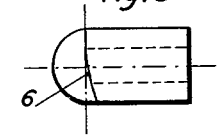
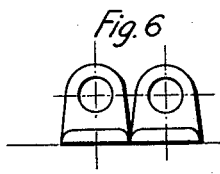
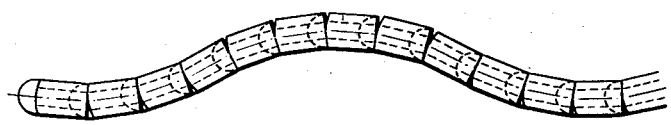
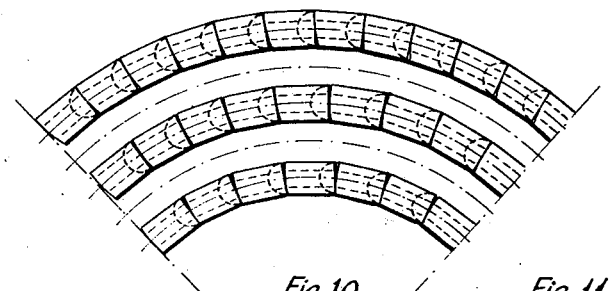
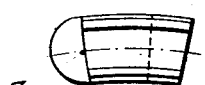
INVENTOR
Etienne Challet
BY
ATTORNEY Patented June 21, 1938

2,121,283

UNITED STATES PATENT OFFICE 2,121,283

INSULATING MEMBER FOR ELECTRIC HEATING ELEMENTS

Etienne Challet, Paris, France, assignor of one-fourth to Entreprises Electriques Fribourgeoises, Fribourg, Switzerland, a company of Switzerland Application March 29, 1937, Serial No. 133,709
In Switzerland April 6, 1936

7 Claims. (Cl. 173—28)

The object of the present invention is an insulating member for a heating element, intended to receive the heating resistance coil, in particular for electric heating plates. Said insulating member has a cavity for the heating coil and a flat base. It serves as a component of a heating element; a series of said insulating members being placed consecutively and fitted into each other in such a manner that they are mutually joggled.

According to the invention, each member is provided at one end with a tongue and at the other with a recess adapted to receive the tongue of the preceding member. The length of the tongue is arranged relatively to the thickness of the insulating material between the coil and the heating plate, in such a manner that when an accidental over-voltage occurs and also during the receiving tests, the current does not have more facility for passing through the air along the tongue than through the insulating material forming the bottom of said insulating member.

According to whether the path of the heating element is rectilinear, sinusoidal, spiral, etc. the faces in contact between two consecutive elements will have a shape which is designed to decrease the gap as much as possible, it being assumed that it is not possible in practice, owing to the requirements of manufacturing costs and of judicious manufacture, to have members with different angles, as is the case in the shaping of stones for the construction of the arches of a bridge with diminished arches, for example. A mean shape will therefore be adopted so that the members will all be alike, while obtaining the minimum gap practically possible between two successive members at every point of the path.

To improve the arrangement of the elements in rows, the side walls are set at an angle slightly less than 90° from the bottom surface, which gives the vertical end elevation a trapezoidal shape, so that two adjacent rows only touch at the bottom, thereby contributing to increase the path through which the current would have to travel to go from one coil to the other and to decrease the current leakage from one convolution to the other.

The accompanying drawing shows by way of example, some embodiments of the invention.

Fig. 1 shows a side elevation of insulating member;

Fig. 2 shows a front elevation, and

Fig. 3 a top view thereof.

Figs. 4 and 5 show top views of insulating members wherein the shoulder above the tongue is curved cylindrically.

Fig. 6 shows a front elevation of two insulating members placed side by side.

Fig. 7 shows a top view of a plurality of insulating members as illustrated in Fig. 3 arranged in a straight path.

Figs. 8 and 9 show top views of insulating members as illustrated in Figs. 4 and 5, respectively, arranged in spirals and curves.

Fig. 10 shows a front elevation of an insulating member having an open top.

Fig. 11 shows a top view of an insulating member having an open top and a curved axis.

Figures 1, 2 and 3 show an insulating member according to the invention, in side elevation, end elevation and plan. The body 1 is provided at the front end of the base with a tongue 2 and, on the other end, with a recess 3 for the tongue of the following member. The shoulder 4 which is adapted to contact with the preceding element is in this case placed so that there is no empty space between two elements if a rectilinear path is followed as seen in Figure 7.

In Figure 4, a plan view of an element is shown the shoulder 5 of which is shaped like a portion of a cylinder and which enables an undulating path to be followed, as seen in Figure 8.

If a spiral path is to be followed, it is advantageous to construct an element according to Figure 5 wherein the shoulder 6 is of a cylindrical shape, is sloping and, to standardize the manufacture of the parts, this slope has been chosen to suit the mean convolution of the spiral, as in Figure 9 wherein the medial convolution has its elements almost touching one another, whereas the others are open towards the outside of the curve for the convolutions which are nearest the centre and towards the inside for those at the periphery. (For the clearness of the drawing, the two intermediate convolutions have not been shown.)

Figure 6 shows how the sloping sides provide a space between two adjacent rows of members.

Figure 10 shows a modification of the insulating member seen from the end. The cavity for the resistance has the shape of an open channel and the coil of wire is applied as closely as possible on the bottom and the walls.

The axis of an insulating member according to the invention may be straight or curved. The latter embodiment is shown in Fig. 11.

I claim:

1. An improvement in the type of insulating members for heating elements that has a cavity for the heating coil; said improvement comprising a flat base provided at one end with a lower tongue and at the other end with a recess adapted to receive the tongue of another insulating member in order that a plurality of members may be arranged consecutively and fitted into each other to form a sheath for an electric heating element, and each further having two end shoulders respectively above said tongue and said recess, and two outer side walls.

2. An improvement in insulating members according to claim 1, wherein the length of the tongue is arranged relatively to the thickness of the insulating material between coil and heating plate, in such a manner that when an accidental over-voltage occurs, the current does not have more facility for passing through the air along the tongue than through the insulating material forming the bottom of said insulating member.

3. An improvement in insulating members according to claim 1, wherein the front shoulder comprises a plane.

4. An improvement in insulating members according to claim 1, wherein the front shoulder comprises a cylindrical surface.

5. An improvement in insulating members according to claim 1, wherein the front shoulder comprises a cylindrical surface which slopes with respect to the axis of said insulating member, and which is calculated for the mean arc of curvature of a spiral arrangement of insulating members, so as to form a heating element with the minimum gap practicable between adjacent insulating members.

6. An improvement in insulating members according to claim 1, wherein the side walls are set at an angle of slightly less than 90° from the flat base.

7. An improvement in insulating members according to claim 1, wherein the top of the insulating member is an open channel.

ETIENNE CHALLET.